United States Patent
Miller

(10) Patent No.: US 11,746,605 B2
(45) Date of Patent: *Sep. 5, 2023

(54) HARDBANDING METHOD AND APPARATUS

(71) Applicant: Postle Industries, Inc., Cleveland, OH (US)

(72) Inventor: Robert F. Miller, Birmingham, AL (US)

(73) Assignee: POSTLE INDUSTRIES, INC., Cleveland, OH (US)

(*) Notice: Subject to any disclaimer, the term of this patent is extended or adjusted under 35 U.S.C. 154(b) by 38 days.

This patent is subject to a terminal disclaimer.

(21) Appl. No.: 16/951,168

(22) Filed: Nov. 18, 2020

(65) Prior Publication Data

US 2021/0071484 A1  Mar. 11, 2021

Related U.S. Application Data

(60) Division of application No. 16/238,078, filed on Jan. 2, 2019, now Pat. No. 10,954,728, which is a continuation of application No. 14/643,807, filed on Mar. 10, 2015, now Pat. No. 10,267,101.

(60) Provisional application No. 61/991,223, filed on May 9, 2014, provisional application No. 61/950,520, filed on Mar. 10, 2014.

(51) Int. Cl.
*E21B 17/10* (2006.01)
*B23K 9/00* (2006.01)
*B23K 9/04* (2006.01)

(52) U.S. Cl.
CPC ........ *E21B 17/1085* (2013.01); *B23K 9/0026* (2013.01); *B23K 9/048* (2013.01)

(58) Field of Classification Search
CPC .... B23K 9/0026; B23K 9/048; E21B 17/1085
See application file for complete search history.

(56) References Cited

U.S. PATENT DOCUMENTS

| 2,759,083 A | 8/1956 | Richter et al. |
| 8,474,541 B2 | 7/2013 | Branagan et al. |
| 2006/0177689 A1 | 8/2006 | Muir et al. |

(Continued)

OTHER PUBLICATIONS

AC/DC Understanding Polarity. https://web.archive.org/web/20131007082018/http://www.lincolnelectric.com/en-us/support/process-and-theory/Pages/understanding-polarity-detail.aspx (Year: 2013).

(Continued)

*Primary Examiner* — Jenny R Wu
(74) *Attorney, Agent, or Firm* — Ulmer & Berne LLP; Brian E Turung

(57) ABSTRACT

Various methods of hardbanding an apparatus are described. In one aspect of the invention an improved method of re-applying a hardbanding alloy to worn tool joints of a previously hardbanded drill pipe results in preservation of the metallurgical properties of the drill pipe and preservation of the internal polymer coating that lines the drill pipe. A method for applying hardbanding includes arc welding a consumable metal welding wire to a tool joint having a surface temperature that ranges from about 50° F. to about 170° F. and the arc welding power supply utilizes DC current. The method herein produces a hardbanded tool joint comprising a heat affected zone (HAZ) of a based metal having a Rockwell hardness of 40 Rc or less.

27 Claims, 6 Drawing Sheets

(56) References Cited

U.S. PATENT DOCUMENTS

2011/0068152 A1     3/2011    Cheney et al.
2016/0024621 A1     1/2016    Cheney et al.

OTHER PUBLICATIONS

Welding Parameters—CLAMS, machine settings, torch manipulation and travel angle. https://web.archive.org/web/20121209043206/http://www.weldersuniverse.com/welding_parameters.html (Year: 2012).

Summary of Changes in ASME Section IX, 2000 Addenda (Year: 2000).

Welding Beads—An introduction. https://web.archive.org/web/20121231053106/http://www.weldersuniverse.com/welding_beads.html (Year: 2012)\.

Sanjay Kumar, Srinivasa Rao and A. Ramakrishna. Effects of eccentricity and arc rotational speed on weld bead geometry in Pulsed GMA welding of 5083 aluminum alloy. Journal of Mechanical Engineering Research vol. 3 (6), p. 186-196, Jun. 2011 (Year: 2011).

HARDBANDING METHOD AND APPARATUS

RELATED APPLICATION

This patent application is divisional U.S. application Ser. No. 16/238,078 filed Jan. 2, 2019, which in turn is a continuation of U.S. application Ser. No. 14/643,807 filed Mar. 10, 2015 (now U.S. Pat. No. 10,267,101, issued Apr. 23, 2019), which in turn claims priority to U.S. Application Ser. No. 61/950,520 entitled "Hardbanding Method and Apparatus" filed on Mar. 10, 2014, and U.S. Application Ser. No. 61/991,223 entitled "Hardbanding Method and Apparatus" filed on May 9, 2014, the entirety of which are incorporated by reference herein.

TECHNICAL FIELD

The present invention relates generally to hardbanding methods and apparatus. More specifically, the present invention relates to methods for applying or re-applying hardbanding wire to tool joints of drill pipe in the oil and gas industry.

BACKGROUND

Hardbanding is a surface welding process that is commonly used in the oil and gas industry to apply metal welding wire onto the surface of many industrial parts, including tool joints of drill pipe. In such a process an elongated metal wire is welded to the tool joint to build, reinforce, or repair the part to extend the utility of the part that is subjected to high frictional forces and abrasive forces. In oil drilling applications for the oil and gas industry, for example, drill pipes are connected together at the ends which are referred to as "tool joints" to form a "drill string" of several hundred feet lengths. The tool joints have a much larger outside diameter than the tube portion of the drill pipe, and therefore, the vast majority of the wear during drilling occurs on the tool joints. To protect the tool joints from excessive wear they are surfaced welded with an appropriate abrasion resistant consumable welding wire. The inside of the drill pipe is coated with a polymer, an internal polymer coating (IPC), to protect against corrosion by the fluid or particles entrained in the fluid during drilling.

Typically, the initial hardbanding of drill pipe usually occurs at the drill pipe manufacturer's facility. Tool joints of drill pipe in the oil and gas industry are applied as a "weave bead" weld deposits of about one inch (1") wide. The heat produced by the welding during hardbanding melts the base metal of the tool joint beneath the surface in the area where the welding wire is applied. During the subsequent cooling process, a portion of the base metal beneath the welding arc forms a low hardness metallurgical phase which is referred to as the base metal "heat affected zone" (HAZ) or base metal HAZ. Once the hardbanding process is complete, the internal plastic coating (IPC) is applied to the inside surface area of the drill pipe. The finished drill pipe is then shipped to the drill site and put into service until it must undergo another hardbanding process due to wear of the hardbanding material, or other anomalies, during drilling.

The known methods of the re-application of hardbanding on worn tool joints presents technical challenges in maintaining properties required industry standards. Conventional processes for the re-application of hardbanding includes preheating the tool joint from 250° F. to 600° F., welding with the wire to the worn surface of the previously applied hardbanding, followed by slow cooling. The high preheating and welding temperatures cause the internal polymer coating on the inside surface of the tool joint to deteriorate during welding. For many drilling environments, this degradation of the polymer coating is unacceptable and so the drill pipe requires an additional coating process after reapplication of the hardbanding. An alternative hardbanding process to preserve the internal polymer coating is to introduce standing or continuously running water through the inside diameter of the pipe during the welding process. While this procedure can maintain the properties of the polymer coating, water cooling effectively quenches the weld deposit and hardens the base material HAZ to Rockwell hardness greater than the maximum industry specification of 40Rc. Thus, the current known methods for reapplication of hardbanding, whether water is employed, results in rejected tool joints and drill pipes.

SUMMARY

Improved methods of applying a hardbanding alloy to drill pipe and the resulting drill pipe having desired physical properties are disclosed. In one embodiment a method of applying a hardbanding alloy to a tool joint of a drill pipe includes arc welding a consumable metal welding wire to a previously applied hardband metal having a surface temperature that ranges from about 50° F. to about 170° F., and wherein the arc welding power supply utilizes direct current (DC).

In another embodiment, a hardbanded tool joint comprises an internal polymer coating, a base metal, a base metal heat affected zone (HAZ) having a Rockwell hardness of less than about 40 Rc, and a stringer weld-bead zone comprising a stringer metal along the surface of the tool joint.

BRIEF DESCRIPTION OF THE DRAWINGS

The various embodiments of the present invention can be understood with reference to the following drawings of FIGS. 1 through 14. The components in the drawings are not necessarily to scale.

DETAILED DESCRIPTION

Various methods of applying hardbanding to a tool joint of drill pipe and embodiments of tool joints are disclosed herein. Particular embodiments of the invention will be described below in relation to its applications in the oil and gas drilling industry; however, it will be appreciated that the present invention could be employed in other industrial applications.

Figure 1:
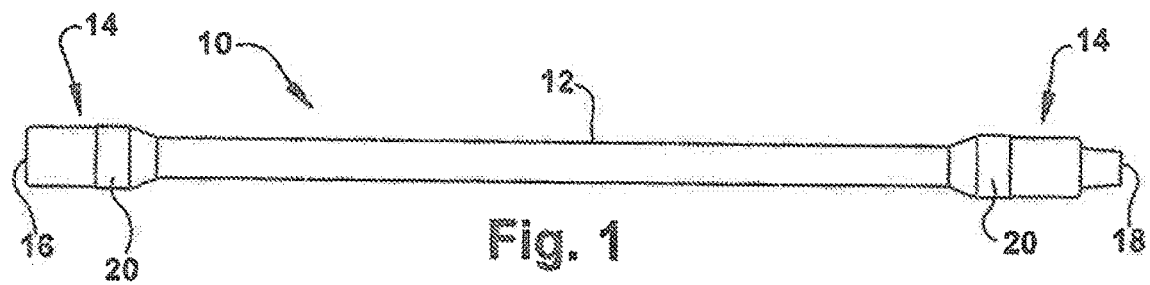
FIG. 1 illustrates a side view of a drill pipe, according to an embodiment of the present invention.

FIG. 1 shows an example embodiment of a drill pipe 10 which includes a tube portion 12 and two attached tool joints 14, the box end 16 and the pin end 18. Drill pipes connected together at the box end and pin end form a "drill string" of several hundred feet lengths. The tool joints 14 have a much larger outside diameter than the tube portion 12 of the drill pipe, and therefore, the vast majority of the wear during drilling occurs on the tool joints.

Figure 2:
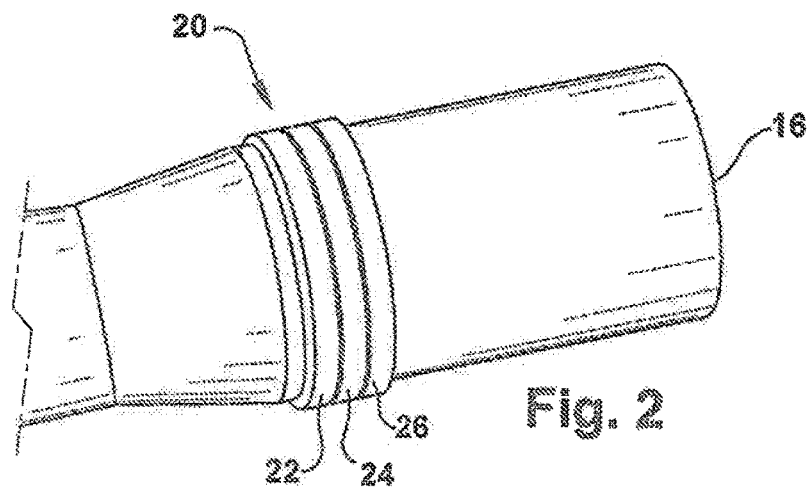
FIG. 2 is a close perspective view of a box end tool joint of the drill pipe of FIG. 1 with hardbanding thereon, according to an embodiment of the present invention.

FIG. 2 is a perspective view of box end 16 tool joint of the drill pipe 10 of FIG. 1 with hardbanding 20 applied thereon. To protect the tool joints from excessive wear they are surfaced welded with an appropriate abrasion resistant consumable welding wire, such as, for example, Duraband® NC of Postle Industries, Inc. of Cleveland, Ohio. The box end 16 of the tool joint is shown with three "weave" weld beads 22, 24, 26 which may overlap slightly for consistency. The pin end 18 typically has a less hardbanding 20 on the surface than the box end 16, although width of the hardbanding on the box end and pin end can vary. The original hardbanding application, i.e. the application of the first surface weld of a new drill pipe, usually occurs at the drill pipe manufacturer's facility.

Figure 3:
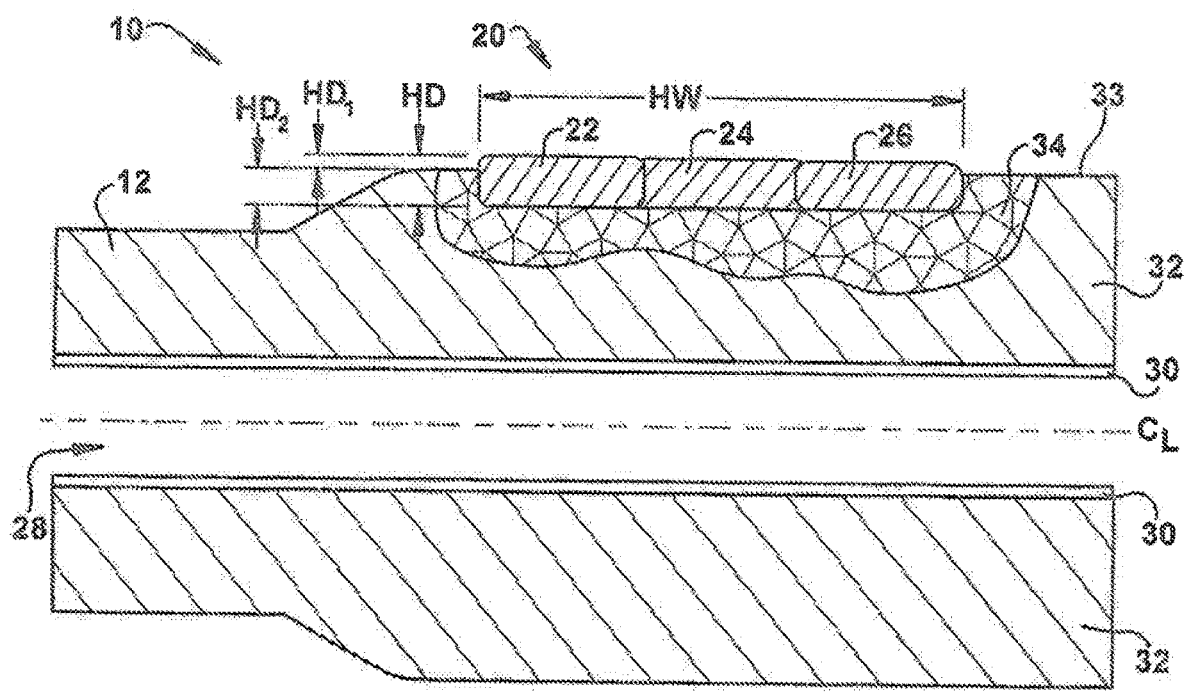
FIG. 3 is a cross-sectional illustration of a tool joint of FIG. 2, according to an embodiment of the present invention.

FIG. 3 illustrates a cross-sectional view of the tool joint 10 of FIG. 2 showing the hardbanding 20 applied to the surface of a drill pipe 10, for example a newly manufactured drill pipe. The overall hardband width, HW, of tool joints for oil and gas drilling, for example, is typically about three inches (3"). The weld beads 22, 24, 26 of made of about three one-inch (1") "weave" beads 22, 24, 26 for an overall hardband width, HW, of about three inches (3"). In many applications, the overall hardband weld thickness or hardband depth, HD, is typically about 3/16" but can range from about 3/16" thick to about 1/4" The preheating and application of the weave weld beads melts the surface of the tool joint made of a base metal and such that the weave weld bead resides partially below and partially above the surface of the tool joint. The thickness or depth of the weave bead residing above the surface of the tool joint, $HD_1$, is about 3/32" and the depth of the weave bead residing below the surface, $HD_2$, of the tool joint, is about 3/32", although the depth can vary.

The cross-section of FIG. 3 also reveals the core opening 28 of the drill pipe through which fluid flows during drilling. The finished drill pipe 10 includes an internal polymer coating 30 which is applied to the internal diameter of the base metal 32 after the hardbanding operation of the weave bead type, and before it is shipped to the drill site and put into service. The internal coating can be made of several possible thermoplastic or thermoset polymers known in the oil and gas industry, for example a polymer such as NOV Tuboscope® TH34P or NOV Tuboscope® TK34XT from National Oilwell Varco of Houston, Tex.

The application of the original hardbanding 20, prior to the application of the internal plastic coating 32 requires preheating of the drill joint made of base metal 32 for adequate arc penetration and also so that the tool joint has proper metallurgical phase profile and physical properties, for example hardness. The preheat temperature also depends at least in part on the diameter of the tool joint can range from temperatures of 150° F. to about 600° F. (66° C.-316° C.) for tool joints having outer diameters that range from 3⅛" to 8½", respectively. Higher preheat temperatures are required to maintain adequate surface temperatures due to the larger mass and heat sink of the larger tool joints. Typical preheat temperatures for various size tool joints are listed in Table 1.

TABLE 1

| Tool Joint OD | Weave Bead Preheat Temp (° F.) | Weave Bead Preheat Temp (° C.) |
|---|---|---|
| 3⅛" to 4¾" | 150-200 | 66-93 |
| 4¾" to 5¼" | 200-250 | 93-121 |
| 5½ to 6¼" | 400-450 | 204-232 |
| 6⅜ to 6⅞" | 450-550 | 232-288 |
| 7 to 7⅞" | 550-600 | 288-316 |
| 8 to 8½" | 650-700 | 343-371 |
| 8" to 8½" | 550-600 | 288-316 |

The arc penetration is also affected by the level of preheat applied to the tool joint prior to hardbanding. Note that the temperatures for the larger tool joints may be above the critical temperatures for specific internal plastic coating (IPC). The role of DC Power Supply connections has an effect upon the depth of penetration.

Referring to FIG. 3, the preheating and arc welding heats the depths of the base metal 32 below the surface 33 of the tool joint 10 and below hardband 20. After hardbanding, the tool joint is then cooled and the slow cooling process allows the base metal beneath the hardbanding to form a low hardness metallurgical phase, i.e. a low hardness martensitic phase, which is referred to as the Base Metal "heat affected zone" (HAZ). In the example shown, the original application of hardband 20 forms a base metal HAZ 34. The standard specifications of drill pipe in the oil and gas industry require that the Rockwell hardness of the base metal HAZ cannot exceed 40 Rc so that the tool joint is not susceptible to cracking during operation. Therefore, the proper cooling rate of the tool joints following hardbanding ensures that base metal HAZ forms a low hardness phase and does not become too hard and become prone to cracking during the drilling operation.

Figure 4:
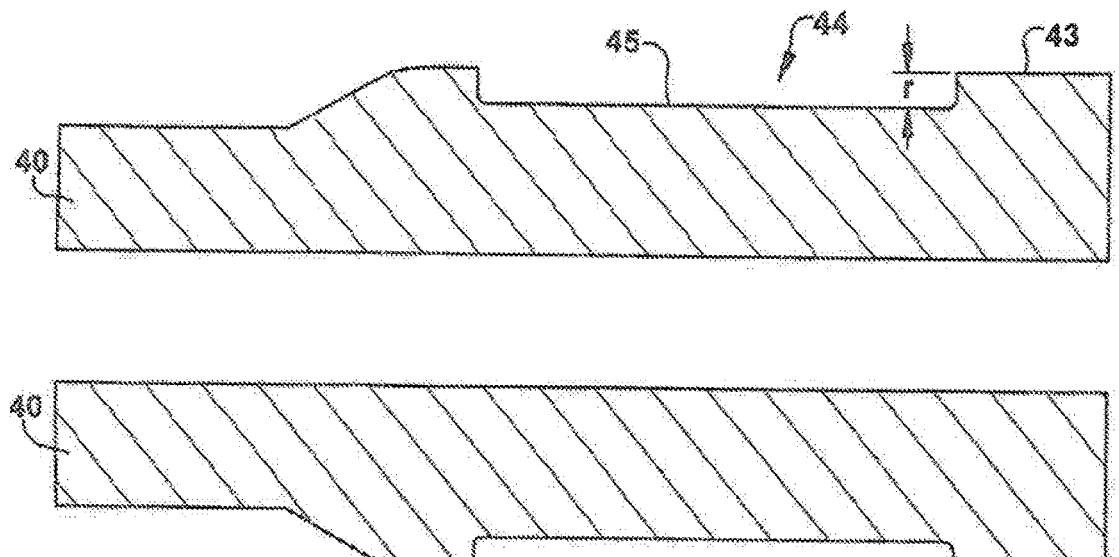
FIG. 4 is a cross-sectional view of a tool joint having a recessed surface, according to an embodiment of the present invention.

FIG. 4 is a cross-sectional view of an unfinished tool joint prior to the application of hardbanding and the internal coating processes. The tool joint has a groove machined into the surface of the tool joint where the hardbanding 20 is to be applied. Tool joint 10 has an outer surface 43 and recessed surface 45 of groove which is a distance, r, from outer surface 43. Therefore, in one embodiment of the present invention the tool joint of the drill pipe has a groove 44 with a recessed surface 45 prior to hardbanding. When welding wire is applied to form hardband, the presence of the groove 44 increases the depth, $HD_2$, of the portion of the weave bead residing below the surface of the tool joint described above in FIG. 3. The groove effectively increases the depth of the base metal HAZ 34 that is formed relative to the outer surface 43 of the tool joint, and thereby increases the distance between the base metal HAZ 34 and subsequent surface treatments through the re-application of welding wire as will be further described in detail below. The depth of the groove is such that the recessed surface 45 is a distance, r, from the outer surface 43 of the tool joint is about 1/16" but can range from between about 1/32" to about 3/32", for example. The presence of recesses surface 45 helps ensure that the depth of subsequent hardbanding beads will be confined to the depth of the original hardbanding bead and remain external to the base metal HAZ.

Figure 5:
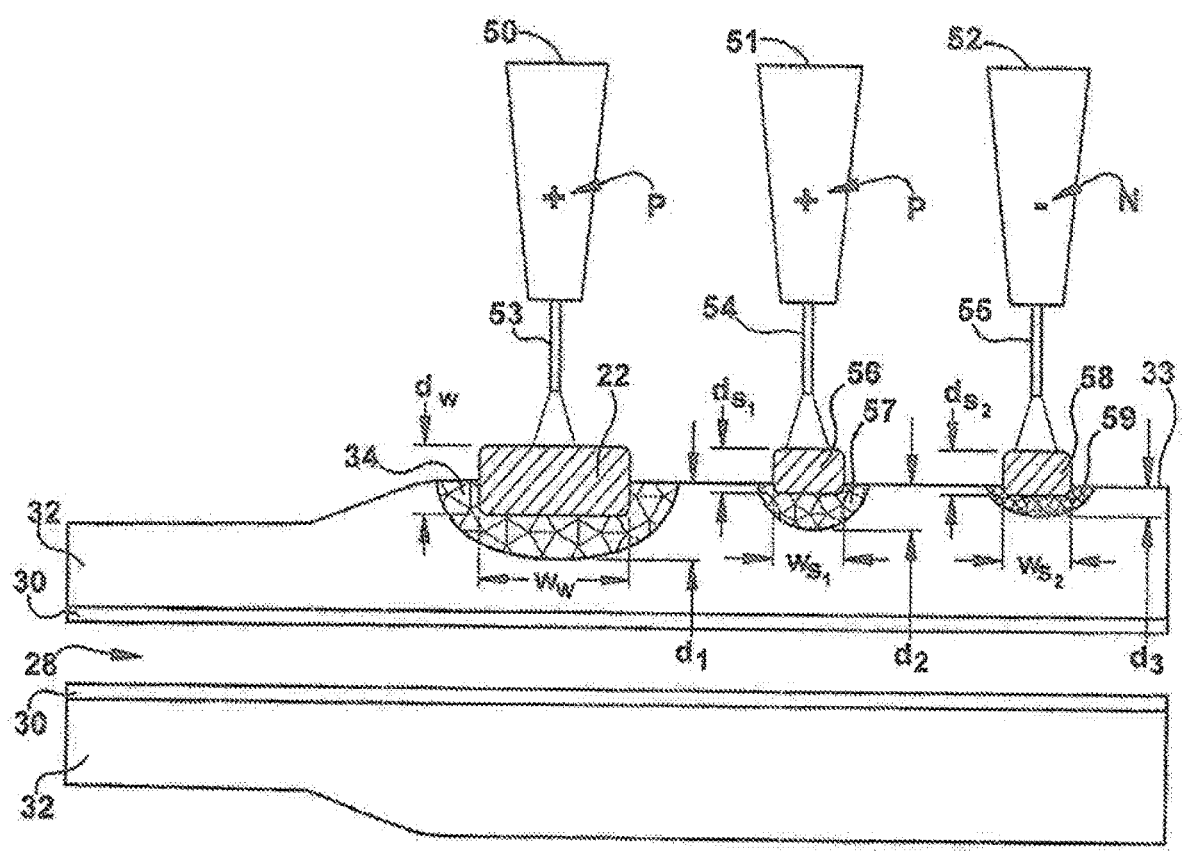
FIG. 5 is a schematic illustration of a tool joint illustrating weave bead and stringer bead weld deposits, according to an embodiment of the present invention.

FIG. 5 is a schematic cross-sectional illustration of a tool joint showing various hardbanded weld beads utilized in the various embodiments of the present invention. Box end of tool joint 16 includes core opening 28 for fluid flow and internal polymer coating 30 applied to the internal surface of the base metal 32. Schematic illustrations of welding units, or welding torches, 50, 51 and 52 are shown applying welding wire 53, 54, and 55, respectively, from a direct current (DC) power supply. The application of welding wire, or hardbanding method, as described herein may be applied to the surface of a tool joint that is newly manufactured or may be the reapplication of welding wire to a tool joint of a used drill pipe. In a reapplication hardbanding method, the welding wire is applied to the remainder of the previously applied hardband metal. As mentioned above with respect to FIG. 3, FIG. 5 also illustrates that the application of the "weave" weld bead 22 on the surface 33 of the tool joint creates base metal heat affected zone (HAZ) 34. Weave bead 22 has a depth, $d_w$, and a width, $w_w$. The weave weld bead is applied while the weld torch is oscillated, i.e. an oscillating motion, along the surface parallel to the longitudinal axis, $C_L$ (FIG. 3), of the tool joint as the tool joint is rotated radially. The width, $w_w$, of a single weave bead 22 can vary and is typically about one inch for a tool joint in the oil and gas drilling industry. The number of beads applied depends upon the width of each individual weave bead, $w_w$, and the overall hardband width, HW, desired. For example, as mentioned above with respect to FIG. 3 a tool joint for the oil and gas drilling may have three, one-inch wide weave weld beads to form a hardband width HW of about three inches (3").

In accordance with an alternative embodiment of the present invention, the first hardbanded layer on a tool joint of a drill pipe, whether it is the original hardband material or a reapplied hardband, can include one or more "stringer" weld beads, for example, stringer weld bead 56. A stringer weld bead is smaller in dimensions than a weave weld bead and can be applied as an original hardband, or as a reapplication of a hardband to a worn tool joint as will be further described herein. FIG. 5 shows that stringer weld bead 56 applied by welding torch 51, has a width, $w_{s1}$, and a depth, $d_{s1}$. The width $w_{s1}$ and depth $d_{s1}$ dimensions of the stringer bead are less than the width $w_w$ and depth $d_w$ dimensions of the weave bead. In one embodiment, the width, $w_{s1}$, of the stringer bead is about 20% to about 60% of the width, $w_w$, of a weave weld bead, alternatively about 25% to about 50%, and alternatively about 25% to 40% of the width of the weave weld bead. For example, the stringer weld bead zone can have from about 6 to about 12 stringer weld beads over a hardband width, HW, of about 3 inches, alternatively from about 7 to about 11 stringer weld beads over the hardband width, HW, of about three inches, and in yet another embodiment from about 8 to about 10 stringer weld beads over the same three-inch hardband width. This results in more weld beads over a given unit length of the tool joint compared to the number of weave weld beads across the same length along the longitudinal axis. The depth, $d_{s1}$, of the stringer bead is about 20% to about 90% of the depth, $d_{s1}$, of a weave weld bead, alternatively about 25% to about 60%, and alternatively about 25% to 40% of the depth of the weave weld bead. Hardbanding of tool joints with stringer weld beads is performed with little or no oscillation of the welding torch while the tool joint is rotated under the welding arc.

In addition to the bead shape change from weave weld bead to the stringer weld bead, there is a noticeable change in the depth of penetration of the heat affected zone (HAZ) of the tool joint. FIG. 5 shows that the base metal heat affected zone (HAZ) 57 created by the application of stringer weld bead 56 has a depth, $d_2$, beneath the surface 33 of the tool joint and is not as deep as the base metal heat affected zone (HAZ) 34 having a depth, $d_1$, created by the application of weave weld bead 22. Therefore, a larger mass of base metal 32 is present beneath the base metal heat affected zone (HAZ) 57 compared to the smaller mass of base metal 32 beneath the base metal heat affected zone (HAZ) 34. As a result, stringer weld bead 56 and the base metal heat affected zone (HAZ) 57 reside closer to the surface 33 of the tool joint and at a greater distance from the internal polymer core 30 compared to weave bead 22 and base metal heat affected zone (HAZ) 34.

FIG. 5 also illustrates a second-stringer weld bead 58 applied by welding torch 52 using direct current, DC, according to another embodiment of the present invention. By contrast to weave weld bead 22 formed using welding torch 50 which is set to setting, P, which corresponds to direct current electrode positive (DCEP), and stringer weld bead 56 which is formed by welding torch 51 also set at direct current electrode positive (DCEP), stringer weld bead 58 is formed using welding torch 52 set at setting N which corresponds to direct current electrode negative (DCEN). Stringer weld bead 58 has a width, $w_{s2}$, and a depth, $d_{s2}$, that are less than the width and depth dimensions of both weave weld bead 22 and stringer weld bead 57. In addition, the depth of the base metal heat affected zone (HAZ) 59 beneath the stringer weld bead 58 has a depth, $d_3$, that is less than the depth, $d_1$, of the base metal heat affected zones (HAZ) 34 beneath weave weld bead 22, and less than the depth, $d_2$, of base metal heat affected zone (HAZ) 57 which resides beneath stringer weld bead 56. The smaller stringer weld bead 58 and smaller base metal heat affected zone (HAZ) 59 reside closer to the surface 33 of the tool joint than the stringer weld bead 56 applied using direct current with electrode positive polarity (DCEP). Whereas weave bead 22 is applied while the weld torch is oscillated, stringer beads 56 and 58 are formed with little or no oscillation of the weld torch.

The rotational speed of the drill pipe while applying stringer beads is greater than the rotational speed while applying a weave weld bead. The rotational speeds to produce a stringer bead weld zone can vary up to as much as three (3) times faster than the rotational speed used to form weave beads, although the rotational speed will vary depending upon the width of the stringer beads and the welding parameters. For example, the rotational speed of the drill pipe during application of the welding wire for a hardband of stringer weld beads ranges from about 0.25 revolutions per minute to about 3 revolutions per minute, alternatively from about 0.5 revolutions per minute to about 2 revolutions per minute, and yet alternatively from about 0.7 to about 1.5 revolutions per minute. In applying welding wire to form stringer beads, the rotational speed of the tool joint must be increased to accommodate the molten metal deposited, given the same welding amperage and voltage.

Figure 6:
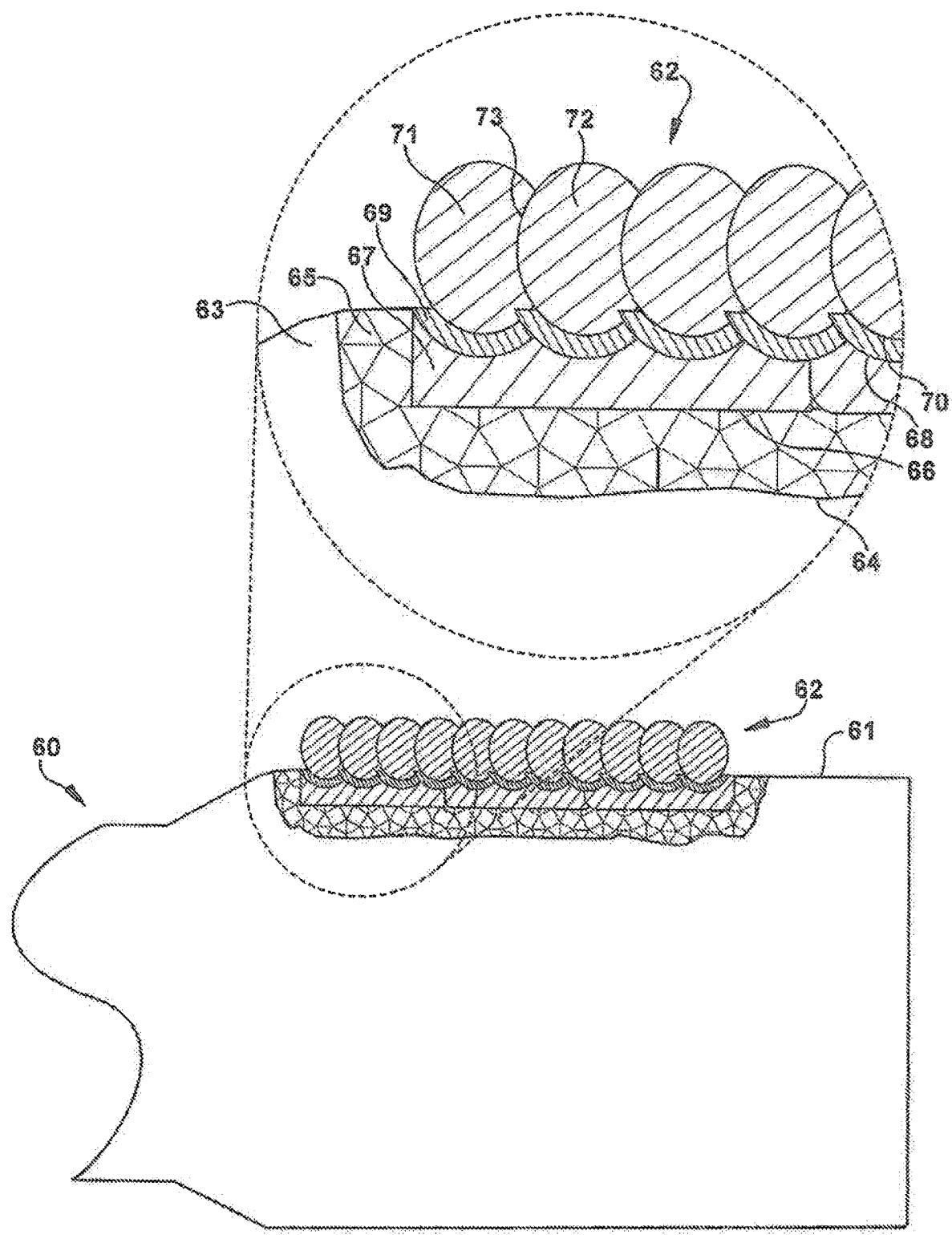
FIG. 6 is a schematic cut-away view of a tool joint after reapplication of hardbanding, according to an embodiment of the present invention.

FIG. 6 is a schematic cut-away view of a tool joint 60 after reapplication of hardband 62 on surface 61 of the tool joint, according to an embodiment of the present invention. The expanded view of the schematic cut-away of the tool joint 60 shows base metal 63 and base metal heat affected zone (HAZ) 65 beneath the original or previously applied hardband weld zone 67. The reapplied hardband 62 is also a referred to as a stringer bead weld zone 62 made of a plurality of stringer beads, for example stringer beads 71 and 72 that are applied to the tool joint as it is rotated. The overlapping of the stringer beads creates "tie-ins", for example tie-in 73, between stringer beads 71 and 72. When the hardband of stringer weld beads is applied to the worn tool joint, the heat creates a stringer bead heat affected zone (HAZ) 69. This stringer bead heat affected zone (HAZ) 69 affected a portion of the of the previously applied hardband weld zone 67 during the welding of the welding wire to form the stringer bead weld zone 62.

The expanded view of FIG. 6 depicts the various metallurgical zones of tool joint 60. The various metallurgical zones from the surface 61 of tool joint 60 include stringer bead weld zone 62, stringer bead fusion zone 70, stringer bead heat affected zone (HAZ) 69, extreme stringer bead HAZ 68, original or previously applied hardband weld zone 67, original or previously applied hardband fusion zone 66, base metal heat affected zone (HAZ) 65, extreme depth of base metal HAZ, and base metal 63. Base metal 63 can include one of a myriad of metals, for example an iron alloy.

Accordingly, in one embodiment of the present invention a hardbanded tool joint comprises an internal polymer coating 30 (FIG. 5), a base metal zone 63, a base metal heat affected zone (HAZ) 65 having a hardness of about 40 Rc or less, an original or previously applied hardband weld zone 67, comprising a first hardband metal, a stringer bead weld zone 62 comprising a stringer metal. As shown in FIG. 6 the base metal heat affected zone (HAZ) 65 is between the base metal 63 and the original or previously applied hardband weld zone 67 and the base metal heat affected zone (HAZ) 65 has a hardness of 40 or less Rockwell Hardness (Rc). In another embodiment the stringer bead heat-affected zone (HAZ) 69 is disposed between the original or previously applied hardband weld zone 67 and the stringer bead weld zone 62.

As described above with reference to FIG. 5, the role of DC Power Supply connections has an effect upon the depth of penetration. The vast majority of tubular welding wires will operate well when the polarity is electrode positive, DCEP. That is, in the DCEP mode when the welding torch is connected to the positive terminal of the power supply and the work piece, i.e. tool joint is connected to the negative terminal the arc is stable and the spatter is minimal. It has been discovered herein that changing the DC Power Supply connections from DCEP to electrode negative DCEN surprisingly results in a stable arc and lower penetration into the tool joint. When the torch is connected electrode negative DCEN, the welding torch is connected to the negative terminal and the tool joint is connected to the positive terminal, the bombardment of electrons is concentrated in the wire, causing higher burn off rates (i.e. weld wire consumption rate) compared to operation at direct current electrode positive DCEP. Since the burn off rate is higher for exactly the same DCEP settings, an increase in wire speed lowers the voltage and arc length when operating with DCEN, resulting in higher weld deposit rates and higher production rates. Results of experimentation in hardbanding a stringer bead weld when the welding torch set in the electrode negative polarity is discussed further in Examples below.

In one embodiment a method of hardbanding a drill pipe includes arc welding a consumable metal welding wire onto a previously hardbanded tool joint having a surface temperature that ranges from about 50° F. to about 170° F., in another embodiment from about 60° F. to about 160° F., and in another embodiment from about 70° F. to about 150° F. and wherein the arc welding power supply utilizes direct current (DC). In another embodiment the method includes cooling at a rate that ranges from about 100° F. to about 300° F. per hour after arc welding to ensure that the metal in the tool joint achieves the proper metallurgical phase profile and that the hardness of the base metal HAZ does not become too hard. Cooling fluid such as water and pressurized air can be optionally used to control the temperature of the cooling phase, although the use of a cooling medium is not required.

Figure 7:
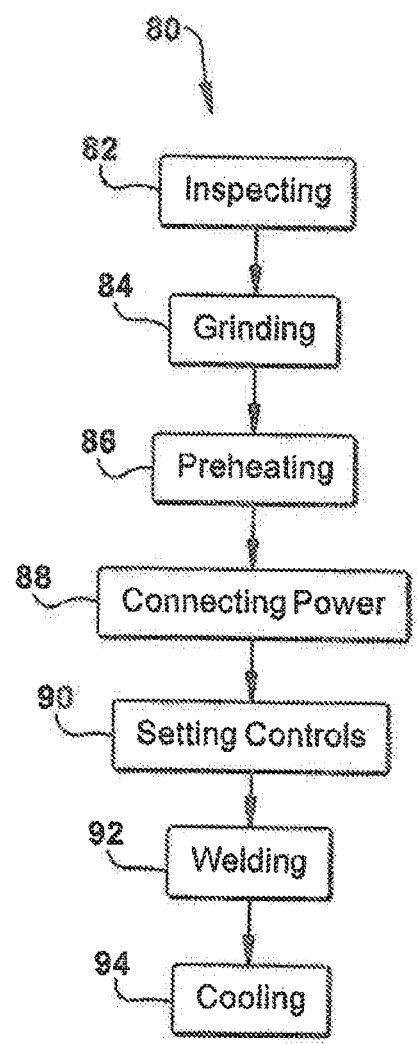
FIG. 7 is a process flow diagram of a process for reapplication of hardbanding, according to an embodiment of the present invention.

A summary of re-application procedures according to an embodiment of the present invention is shown with reference to flow diagram 80 in FIG. 7. In one embodiment the method includes the optional step of inspecting the tool joint with worn hardbanding that was originally or previously applied as the previous hardband bead zone (box 82). Another optional step is grinding the worn hardbanding deposit (box 84) and the ground surface can be flush to the outer diameter (OD) of the tool joint. Next in preparation of re-application of hardbanding, the method includes preheating the tool joint (box 86) so the surface is at least about 70° F. The preheating step is optional if the environmental temperature is less than 70° F. If re-application of hardbanding is being performed in a warmer environment, for example warmer climates or seasons, then the preheating may not be needed. In preparing the welding equipment, the method further includes connecting the direct current (DC) power supply to the weld torch and the setting can be either electrode positive or electrode negative. As explained above, the electrode negative setting will allow for less penetration. The method of hardbanding a tool joint further includes setting controls of the welding equipment (box 90). The weld head includes an oscillator switch which has on and off settings and may allow for some degree of oscillation if "on" mode. The method includes setting the oscillation in the off position, and alternatively, in another embodiment, setting it on the "on" mode so that there is little oscillation. In applying the welding wire, the method further includes rotating the tool joint while depositing stringer welding beads. Optionally, each bead can be overlapped to ensure a smooth transition between weld beads. As an optional step a cooling medium such as water or compressed air may be applied to the outer diameter (ID) or inner diameter (OD), or both, of the tool joint. The welding wire is deposited to achieve the specified width of hardbanding. After the arc and water/air are extinguished the process includes cooling the tool joint to allow slow cooling in ambient air or in some thermal media such as insulated steel cans or a thermal blanket.

The outer surface area of the equipment or component, whether new or previously used, can be inspected prior to welding and may be cleaned of debris, rust, paint, lubricants, and other foreign matter, and the surface may be preheated prior to the application of the weld wire. The wire may be welded (box 92) to the surface of the tool using arc welding. Examples of possible welding processes include, but are not limited to, flux core arc welding (FCAW), gas metal arc welding (GMAW), and plasma arc welding (PAW). After welding, the weld deposit and tool joint are cooled (box 94) at a gradual rate depending upon the application and environment for welding. Typically, the weld beads of the hardband alloy are up to about 25 mm wide and up to about 3 mm thick and can be deposited in single or double layers without spalling. In order to more fully and clearly describe the present invention so that those skilled in the art may better understand how to practice the present invention, the following examples are given. The examples are intended to illustrate the invention and should not be construed as limiting the invention disclosed and claimed herein in any manner.

EXAMPLES

Examples 1-4

Experiments were run to show results of a method of hardbanding to form a stringer bead weld zone using various welding wires having a tubular wire fill. Specifically, tool joints with an internal plastic coating and that had been previously hardbanded and worn in drilling operations were inspected and the surfaces ground so that the previously applied weave bead so that the surfaces were flush with the OD of the tool joint. The welding wires were applied to the tool joints having a surface temperature of 70° F. to form stringer bead weld zone on each tool joint.

Figure 8:
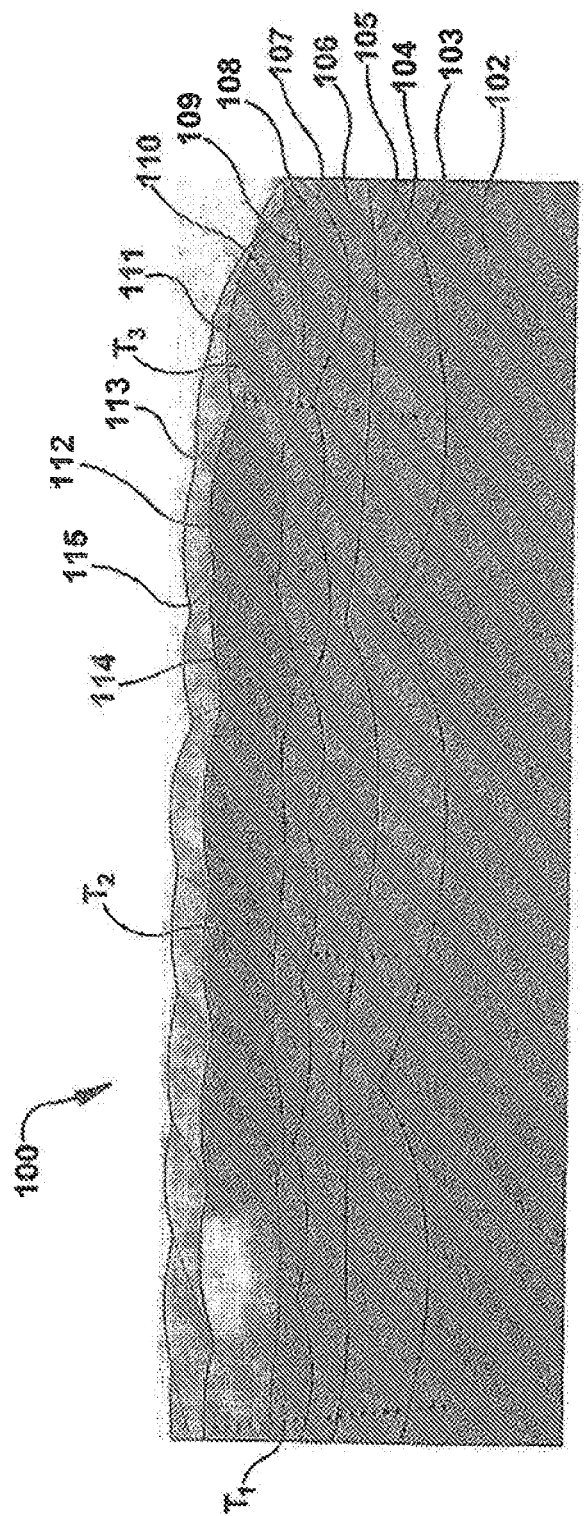
FIG. 8 is a microphotograph of a metallurgical cross-section portion of a tool joint that has undergone reapplication of the hardbanding, according to an embodiment of the present invention.

FIG. 8 a microphotograph of a cross-section of a portion of a tool joint etched to reveal the various metallurgical zones created by hardbanding and re-application of hardbanding. Example 1 is tool joint 100 shown in FIG. 8 had an original hardband weave bead weld zone and the new reapplication of hardband was a stringer bead weld zone formed using Duraband® NC of Postle Industries, Inc. The cross-section reveals the base metal zone 102, an extreme depth of base metal heat affected zone (HAZ) 103, base metal heat affected zone (HAZ) 104, the original or previously applied hardband fusion zone 105, the original or previously applied hardband weld zone 106, the extreme stringer bead heat affected zone (HAZ) 107, the stringer bead heat affected zone (HAZ) 108, the stringer bead fusion zone 109, and the stringer bead weld zone 110. FIG. 8 illustrates where microhardness tracks, T1, T2, and T3 were taken down from the surface through the reapplied hardband, i.e. hardband of stringer weld beads and into the previous hardbanding deposit and further into the base material HAZ, 104 and base material of the tool joint.

Figure 9:
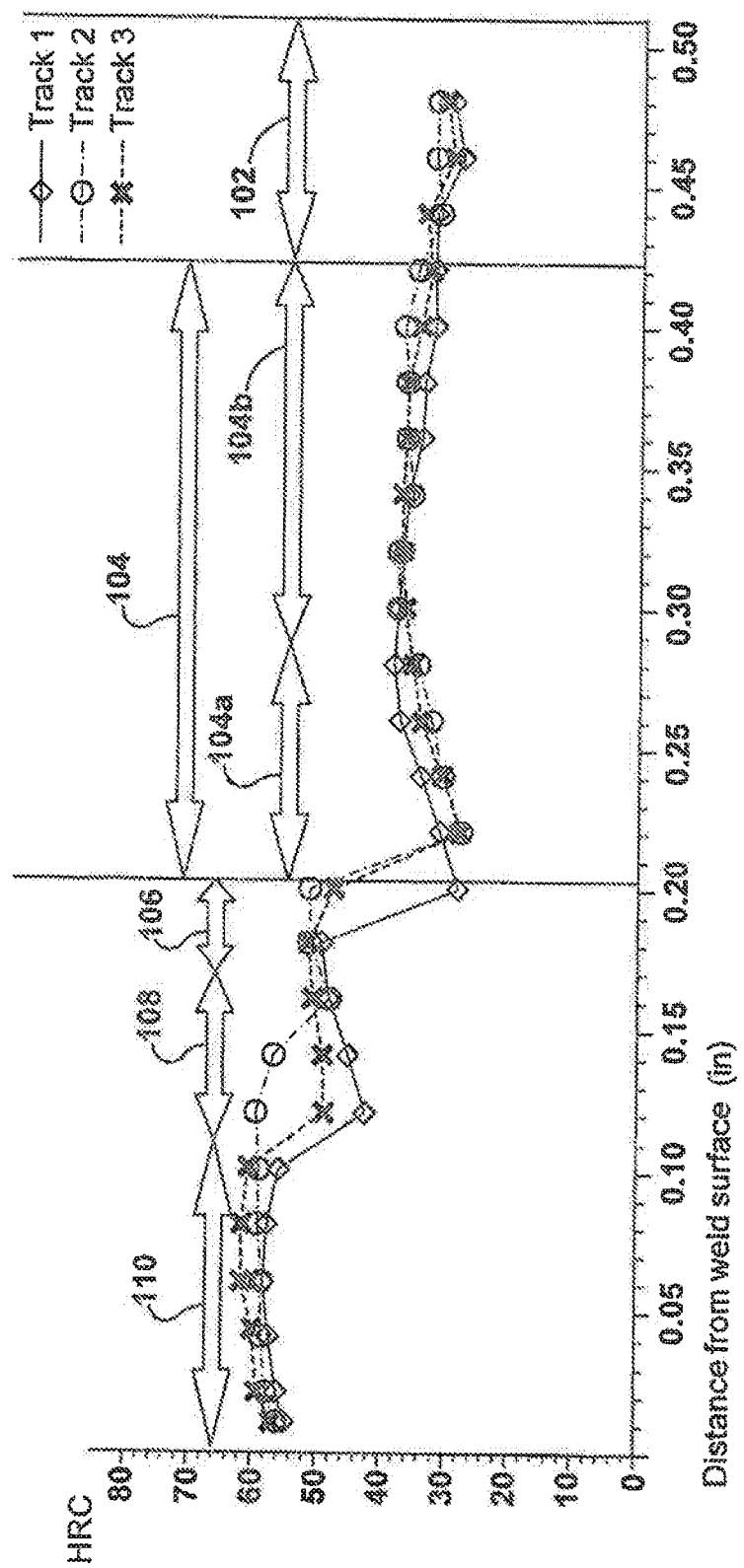
FIG. 9 is a data plot of the microhardness tracks taken through the cross-section of the tool joint of FIG. 8, according to an embodiment of the present invention.

The microhardness values revealed that the base metal HAZ 104 has been preserved the specified requirement of 40 Rc or less. FIG. 9 is a computer-generated graph plot showing the hardness of the various metallurgical zones of tool joint 100 of FIG. 8. The plot clearly shows the effectiveness of the hardbanding method to form a stringer weld bead zone with Duraband® NC stringer beads over previous worn Duraband® NC. The tracks reveal that the Stringer Bead Zone 110 is within expected hardness levels for Duraband® NC. The graph illustrates that Stringer Bead HAZ 108 is the hardness of the previous weave weld deposit that has been thermally affected resulting in lower hardness than the previous hardband metal used to form the weave weld bead. The remnant weave bead or the previously applied weld zone 106 is likewise tempered and results in lower hardness. This illustrates the beneficial effect of the Stringer Bead hardbanding procedure. The unconventional dip seen in hardness serves to blunt any cracks that develop during drilling service. The base metal heat affected zone (HAZ) 104 has a hardness less than 40Rc and the portion of this zone, indicated by 104 a, that is proximate the remnant hardband bead 106 is substantially lower in hardness, below 30Rc, and the portion indicated by 104 b has a hardness that is also substantially below 40Rc. The base metal heat affected zone of conventional hardbanded tool joints which are predominantly martensitic require preheating at high temperatures and typically crack when drastically cooled or quenched. However, the resulting low hardness of tool joint 100 has greater ductility and toughness without preheating. Base metal 102 maintained a hardness within expected hardness levels. The low temperature process of hardbanding also resulted in a lower temperature of the inner diameter (ID) and internal plastic coating.

The attributes of the hardbanding method described above of applying a stringer bead weld zone to used tool joints having a temperature of 70° F. were observed in the various Examples 1 and 2 and Control 1 and Control 2 are listed in Table 2 below. Examples 2 and Control 2 hardbanding methods used direct current electrode positive (DCEP). Examples 1 and Control 1 methods used direct current electrode negative (DCEN) settings. Example 1 observations pertained to hardbanding method which used Duraband® NC hardbanding wire for the stringer bead weld zone to produce the tool joint illustrated and described with reference to FIGS. 8 and 9. Control 1 used the same hardbanding method using DCEN but with another commercial hardbanding welding wire. Example 2 observations pertained to hardbanding method which used Duraband® NC hardbanding wire for the stringer bead weld zone and Control 2 pertained to another commercial welding wire.

The results show that all welding wires were successful in utilizing the described method of reapplication of the hardbanding at 70° F. using both the DCEP and DCEN settings.

TABLE 2

| | Example 1 DCEN | | Example 2 DCEP | |
| --- | --- | --- | --- | --- |
| Attribute | Duraband ® NC | Control 1 | Duraband ® NC | Control 2 |
| Arc Stability | Excellent | Poor | Excellent | Good |
| Spatter | Very Low | Very High | Very Low | Medium |
| Penetration | Low | Low | High | High |
| Dilution | Shallow | Shallow | Deep | Deep |

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed:

1. A hardbanding on a previously hardbanded tool joint of a pipe, said hardbanding comprises a pipe having a tool joint, an outer surface of a portion of said pipe having a prior hardbanding alloy and a base metal heat-affected zone formed during application of said prior hardbanding alloy, said base metal heat-affected zone extending about the sides and bottom of said prior hardbanding alloy, said base metal heat-affected zone extending a greater depth into said tool joint than said prior hardbanding alloy; a secondary hardfacing alloy on at least a portion of a top surface of said prior hardbanding alloy, a top surface of said secondary hardfacing alloy extending above said top surface of said prior hardfacing alloy and also extending above a top surface of said pipe, a secondary heat-affected zone at least partially in said prior hardbanding alloy, a depth of said secondary heat-affected zone less than a depth of said base metal heat-affected zone.

2. The hardbanding as defined in claim 1, wherein said secondary heat-affected zone and said base metal heat-affected zone have a Rockwell hardness of no more than about 40 Rc.

3. The hardbanding as defined in claim 1, wherein said secondary heat-affected zone and said base metal heat-affected zone comprises martensite.

4. The hardbanding as defined in claim 1, wherein said secondary heat-affected zone positioned in said prior hardbanding alloy does not fully extend through said prior hardbanding alloy.

5. The hardbanding as defined in claim 1, wherein said prior hardbanding alloy is formed from one or more prior weld beads each having a width, said secondary hardfacing alloy applied as one or more secondary weld beads, a width of each of said secondary weld bead is 20-60% said width of each of said prior weld beads.

6. The hardbanding as defined in claim 1, wherein said pipe includes a polymer coating on an inner surface of a cavity of said pipe, said polymer coating not damaged by heat during application of said secondary hardfacing alloy.

7. The hardbanding as defined in claim 1, wherein said tool joint includes at least three zones of hardness, said secondary hardfacing alloy having a hardness greater than a hardness of said secondary heat-affected zone, said secondary heat-affected zone having a hardness greater than a hardness of said base metal heat-affected zone.

8. The hardbanding as defined in claim 1, wherein said pipe includes an internal lining comprising polymer.

9. The hardbanding as defined in claim 1, wherein said secondary hardfacing alloy has a depth of about 0.06 in. to about 0.1 in.

10. The hardbanding as defined in claim 9, wherein said secondary hardfacing alloy has a width of about 0.3 in. to about 0.5 in.

11. The hardbanding as defined in claim 9, wherein said secondary hardfacing alloy has a narrower width than said base metal heat-affected zone.

12. A hardbanding on a previously hardbanded tool joint of a pipe; said hardbanding comprises a pipe having a tool joint; an outer surface of a portion of said tool joint having a prior hardbanding alloy and a base metal heat-affected zone formed during application of said prior hardbanding alloy; said base metal heat-affected zone extending about sides and a bottom of said prior hardbanding alloy; said base metal heat-affected zone extending a greater depth into said tool joint than said prior hardbanding alloy; a secondary hardfacing alloy positioned above at least a portion of a top surface of said prior hardbanding alloy; a top surface of said secondary hardfacing alloy extending above said top surface of said prior hardfacing alloy and also extending above a top surface of said tool joint; a secondary heat-affected zone located at least partially in said prior hardbanding alloy; said secondary heat-affected zone that is located below said secondary hardfacing alloy is located between said secondary hardfacing alloy and said prior hardfacing alloy.

13. The hardbanding as defined in claim 12, wherein all of said secondary heat-affected zone is spaced from said base metal heat-affected zone.

14. The hardbanding as defined in claim 12, wherein a depth of said secondary heat-affected zone less than a depth of said base metal heat-affected zone.

15. The hardbanding as defined in claim 13, wherein a depth of said secondary heat-affected zone less than a depth of said base metal heat-affected zone.

16. The hardbanding as defined in claim 12, wherein said secondary heat-affected zone does not fully extend through said prior hardbanding alloy.

17. The hardbanding as defined in claim 15, wherein said secondary heat-affected zone does not fully extend through said prior hardbanding alloy.

18. The hardbanding as defined in claim 12, wherein said prior hardbanding alloy is formed from one or more prior weld beads that each having a width; said secondary hardbanding alloy applied as one or more secondary weld beads; a width of each of said secondary weld bead is 20-60% of said width of each of said prior weld beads.

19. The hardbanding as defined in claim 17, wherein said prior hardbanding alloy is formed from one or more prior weld beads that each having a width; said secondary hardbanding alloy applied as one or more secondary weld beads; a width of each of said secondary weld bead is 20-60% of said width of each of said prior weld beads.

20. The hardbanding as defined in claim 12, wherein said base metal heat-affected zone has a hardness of no greater than 40 Rc.

21. The hardbanding as defined in claim 19, wherein said base metal heat-affected zone has a hardness of no greater than 40 Rc.

22. The hardbanding as defined in claim 12, wherein said pipe includes a polymer coating on an inner surface of a cavity of said pipe.

23. The hardbanding as defined in claim 21, wherein said pipe includes a polymer coating on an inner surface of a cavity of said pipe.

24. The hardbanding as defined in claim 12, wherein said secondary hardbanding alloy has a hardness that is greater than a hardness of said secondary heat-affected zone; said secondary heat-affected zone has a hardness that is greater than a hardness of said base metal heat-affected zone.

25. The hardbanding as defined in claim 23, wherein said secondary hardbanding alloy has a hardness that is greater than a hardness of said secondary heat-affected zone; said secondary heat-affected zone has a hardness that is greater than a hardness of said base metal heat-affected zone.

26. The hardbanding as defined in claim 12, wherein said secondary heat-affected zone has a Rockwell hardness of no more than about 40 Rc.

27. The hardbanding as defined in claim 25, wherein said secondary heat-affected zone has a Rockwell hardness of no more than about 40 Rc.

* * * * *